(12) United States Patent
Ogawa et al.

(10) Patent No.: US 8,587,919 B2
(45) Date of Patent: Nov. 19, 2013

(54) LAMINATE TYPE CERAMIC ELECTRONIC COMPONENT AND MANUFACTURING METHOD THEREFOR

(75) Inventors: Makoto Ogawa, Nagaokakyo (JP); Akihiro Motoki, Nagaokakyo (JP); Takehisa Sasabayashi, Nagaokakyo (JP); Takayuki Kayatani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 173 days.

(21) Appl. No.: 13/208,393

(22) Filed: Aug. 12, 2011

(65) Prior Publication Data

US 2012/0039014 A1   Feb. 16, 2012

(30) Foreign Application Priority Data

Aug. 13, 2010 (JP) ................. 2010-181202

(51) Int. Cl.
*H01G 4/30* (2006.01)

(52) U.S. Cl.
USPC .............. 361/301.4; 361/321.1; 361/321.2; 361/306.1; 361/306.3; 361/301.2

(58) Field of Classification Search
USPC ............. 361/301.4, 301.2, 306.1, 306.3, 361/311–313, 321.1, 321.2, 321.4
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,923,904 B2 * | 4/2011 | Takeuchi et al. | 310/340 |
| 8,154,849 B2 * | 4/2012 | Kunishi et al. | 361/306.3 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |

FOREIGN PATENT DOCUMENTS

| | | |
|---|---|---|
| JP | 63-169014 A | 7/1988 |
| JP | 11-026293 A | 1/1999 |
| JP | 2001-196266 A | 7/2001 |
| JP | 2002-008938 A | 1/2002 |

* cited by examiner

*Primary Examiner* — Nguyen T Ha
(74) *Attorney, Agent, or Firm* — Keating & Bennett, LLP

(57) ABSTRACT

In a laminate type ceramic electronic component, when an external electrode for a laminated ceramic capacitor is formed directly by plating onto a surface of a component main body, the film that is directly plated may have a low fixing strength with respect to the component main body. As the external electrode, a first plating layer composed of a Ni—P plating film with a P content rate of about 9 weight % or more is first formed such that a plating deposition deposited with the exposed ends of respective internal electrodes as starting points is grown on at least an end surface of a component main body. Then, a second plating layer composed of a Ni plating film containing substantially no P is formed on the first plating layer. Preferably, the first plating layer is formed by electroless plating, whereas the second plating layer is formed by electrolytic plating.

4 Claims, 5 Drawing Sheets

ND MANUFACTURING METHOD THEREFOR

LAMINATE TYPE CERAMIC ELECTRONIC COMPONENT AND MANUFACTURING METHOD THEREFOR

BACKGROUND OF THE INVENTION

1. Field of the Invention

The present invention relates to a laminate type ceramic electronic component and a method for manufacturing the laminate type ceramic electronic component, and more particularly, relates to a laminate type ceramic electronic component with an external electrode including a plating film formed directly by plating so as to be electrically connected to a plurality of internal electrodes, and a method for manufacturing the laminate type ceramic electronic component.

2. Description of the Related Art

As shown in FIG. 5, a laminate type ceramic electronic component 101 typified by a laminated ceramic capacitor generally includes a component main body 105 having a stacked structure, which includes a plurality of stacked ceramic layers 102 composed of, for example, a dielectric ceramic, and a plurality of layered internal electrodes 103 and 104 formed along the interfaces between the ceramic layers 102. The respective ends of the plurality of internal electrodes 103 and the respective ends of the plurality of internal electrodes 104 are exposed respectively at first and second end surfaces 106 and 107 of the component main body 105. Furthermore, external electrodes 108 and 109 are formed on first and second end surfaces 106 and 107 of the component main body 105 respectively so as to electrically connect the respective exposed ends of the internal electrodes 103 to each other and the respective exposed ends of the internal electrodes 104 to each other.

For the formation of the external electrodes 108 and 109, in general, a metal paste containing a metal component and a glass component is applied onto the edge surfaces 106 and 107 of the component main body 105, and then subjected to firing, thereby forming paste electrode layers 110 first. Next, first plating layers 111 containing, for example, Ni as their main constituent are formed on the paste electrode layers 110, and second plating layers 112 containing, for example, Sn or Au as their main constituent are further formed thereon. More specifically, each of the external electrodes 108 and 109 is composed of a three-layer structure of the paste electrode layer 110, the first plating layer 111, and the second plating layer 112.

The external electrodes 108 and 109 are required to have favorable solderability when the laminate type ceramic electronic component 101 is mounted onto a substrate with the use of solder. At the same time, the external electrode 108 is required to achieve the function of electrically connecting the plurality of internal electrodes 103 to each other, which are electrically insulated from each other, and the external electrode 109 is required to achieve the function of electrically connecting the plurality of internal electrodes 104 to each other, which are electrically insulated from each other. The second plating layers 112 described above serve to ensure the solderability, whereas the paste electrode layers 110 serve to electrically connect the internal electrodes 103 to each other and the internal electrodes 104 to each other. The first plating layers 111 serve to prevent solder erosion in solder joint.

However, the paste electrode layer 110 is large in thickness, from several tens μm to several hundreds μm. Therefore, in order to limit the dimensions of the laminate type ceramic electronic component 101 up to certain specifications, there is undesirably a need to reduce the effective volume for ensuring a capacitance because there is a need to ensure the paste electrode layers 110 in terms of volume. On the other hand, the plating layers 111 and 112 have a thickness on the order of several μm. Thus, if the external electrodes 108 and 109 can be composed of only the first plating layers 111 and second plating layers 112, the effective volume can be ensured so as to ensure the capacitance.

For example, Japanese Patent Application Laid-Open No. 63-169014 discloses a method for forming an external electrode, in which a conductive metal layer is deposited by electroless Ni plating on the entire sidewall surface of a component main body, at which internal electrodes are exposed, so as to short circuit the internal electrodes exposed at the sidewall surface.

However, the plating film formed directly by plating onto a surface of the component main body has a problem with the fixing strength between the plating film and the component main body, because glass such as in the case of the paste electrode layer described above is not interposed between the plating film and the component main body. In this case, as for the fixing strength, importance is placed on not only the fixing strength between the ceramic section in the component main body and the plating film but also the fixing strength between exposed ends of the internal electrodes and the plating film.

On the other hand, importance is also placed on the film strength (to be unlikely to be cracked) of the plating film. Moreover, it is relatively difficult to achieve a balance between the fixing strength and film strength of the plating film described above.

To explain more specifically, when the laminate type ceramic electronic component is mounted with soldering, a stress is applied to the external electrode. In this case, when the plating film is soft, the plating film is unlikely to be cracked, while the stress described above causes the plating film to peel off to cause a gap between the plating film and the component main body. Therefore, the ingress of moisture will be caused into the gap to degrade the insulation resistance, and thus possibly decrease the reliability of the laminate type ceramic electronic component. On the other hand, when the plating film is made harder, the fixing strength is improved, while the plating film is made fragile so as to be cracked, and thus the reliability of the laminate type ceramic electronic component decreases.

SUMMARY OF THE INVENTION

Preferred embodiments of the present invention provide a laminate type ceramic electronic component and a method for manufacturing the laminate type ceramic electronic component, which solve the problems described above.

According to a preferred embodiment of the present invention, a laminate type ceramic electronic component includes a component main body including a plurality of ceramic layers stacked and a plurality of internal electrodes arranged along the interfaces between the ceramic layers, each of the internal electrodes including an exposed end exposed at a surface; and an external electrode arranged on the surface of the component main body so as to be electrically connected to the exposed ends for each of the internal electrodes, wherein the external electrode is disposed directly on the surface, and includes a first plating layer composed of a Ni—P plating film with a P content rate of about 9 weight % or more, and a second plating layer composed of a Ni plating film containing substantially no P, which is provided on the first plating layer.

In the laminate type ceramic electronic component according to a preferred embodiment of the present invention, preferably, the first plating layer is formed by electroless plating, whereas the second plating layer is formed by electrolytic plating.

In addition, the Ni—P plating film constituting the first plating layer is preferably amorphous.

The present invention is also directed to a method for manufacturing a laminate type ceramic electronic component. According to another preferred embodiment of the present invention, a method for manufacturing a laminate type ceramic electronic component includes the steps of preparing a component main body including a plurality of ceramic layers stacked on each other and a plurality of internal electrodes formed along the interfaces between the ceramic layers, each internal electrode including an exposed end exposed at a surface; and forming an external electrode on the surface of the component main body so as to be electrically connected to the exposed ends for each of the internal electrodes, wherein the step of forming the external electrode includes a step of carrying out electroless plating to deposit a plating deposition with the use of the exposed ends for each of the internal electrodes as starting points, and growing the plating deposition on the surface to form a first plating layer composed of a Ni—P plating film with a P content rate of about 9 weight % or more; and a step of carrying out electrolytic plating to form, on the first plating layer, a second plating layer composed of a Ni plating film containing substantially no P.

In the laminate type ceramic electronic component according to various preferred embodiments of the present invention, first, the first plating layer in the external electrode preferably is composed of the Ni—P plating film with a P content rate of about 9 weight % or more, and the fixing strength can be thus improved. More specifically, the increased P content rate increases the hardness of the plating film. Therefore, the hardness of the first plating layer can be increased. This increased hardness of the first plating layer reduces the film stress in the case of following minute concavity and convexity of the ceramic, thus increasing the anchor effect. Therefore, the joint strength of the first plating layer with the exposed ends of the internal electrodes is totally increased, and peeling is made less likely to be caused at the interface between the first plating layer and the ceramic section around the exposed ends of the internal electrodes. Thus, the reliability in moisture resistance is improved in the case of mounting.

In addition, the increased P content rate improves the corrosion resistance of the plating film. Therefore, the corrosion resistance of the first plating layer is improved, and also in this regard, the reliability in moisture resistance can be improved.

The Ni—P plating film constituting the first plating layer is preferably amorphous as described previously. The amorphous Ni—P plating film favorably follows the concavity and convexity of the ceramic as described above. Therefore, the anchor effect described above can be further increased to further increase the fixing strength, and substantially eliminate the gaps between the first plating layer and the internal electrode, and for example, the sealing property against water vapor can be made favorable to further improve the reliability in moisture resistance.

On the other hand, the first plating layer has the drawback of fragility, because of its high hardness as described above. More specifically, the first plating layer may be cracked due to a stress or a thermal shock applied during mounting and after mounting so as to decrease the reliability in moisture resistance. It is the second plating layer composed of the Ni plating film containing substantially no P that compensates for this drawback. The Ni plating film containing no P is relatively flexible. Therefore, when the first plating layer is protected with the second plating layer, the first plating layer is made less likely to break up, and the reliability in moisture resistance can be thus kept favorable by the first plating layer.

In the way described above, the external electrode can achieve a balance between the fixing strength of the plating film and the film strength (to be unlikely to be cracked) of the plating film.

According to the method for manufacturing a laminate type ceramic electronic component according to a preferred embodiment of the present invention, the first plating layer is preferably formed by electroless plating, and a plating film with a desired P content can be thus formed stably. In addition, the second plating layer is preferably formed by electrolytic plating, thus allowing the second plating layer to be formed efficiently.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The structure of a laminated ceramic capacitor as a laminate type ceramic electronic component according to preferred embodiments of the present invention will be described in accordance with a manufacturing method therefor, with reference to FIG. 1A through FIG. 4.

Figure 1A:
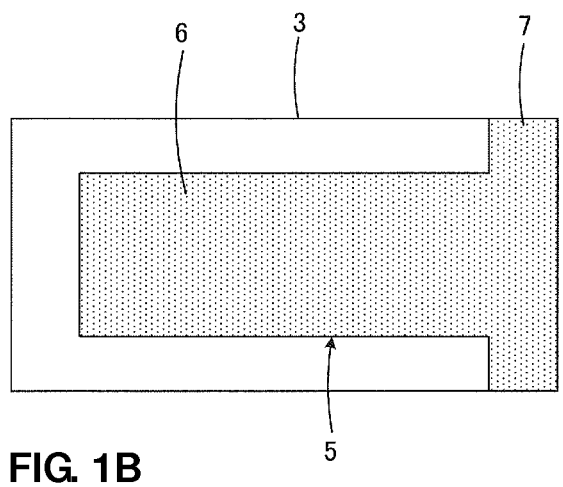
FIGS. 1A and 1B are plan views illustrating two types of ceramic green sheets with an internal electrode printed thereon, which are prepared for manufacturing a laminated ceramic capacitor as a laminate type ceramic electronic component according to a preferred embodiment of the present invention.
Figure 1B:
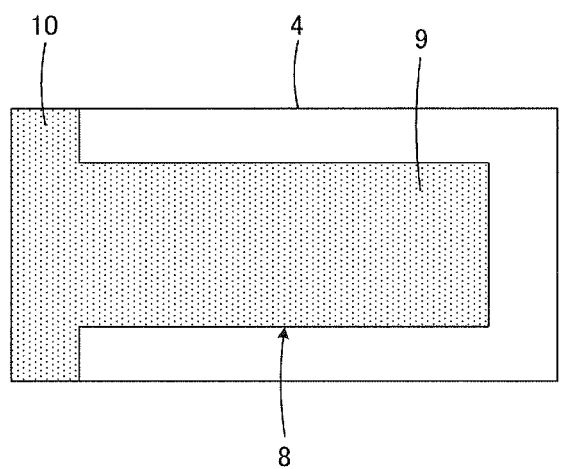
Figure 2:
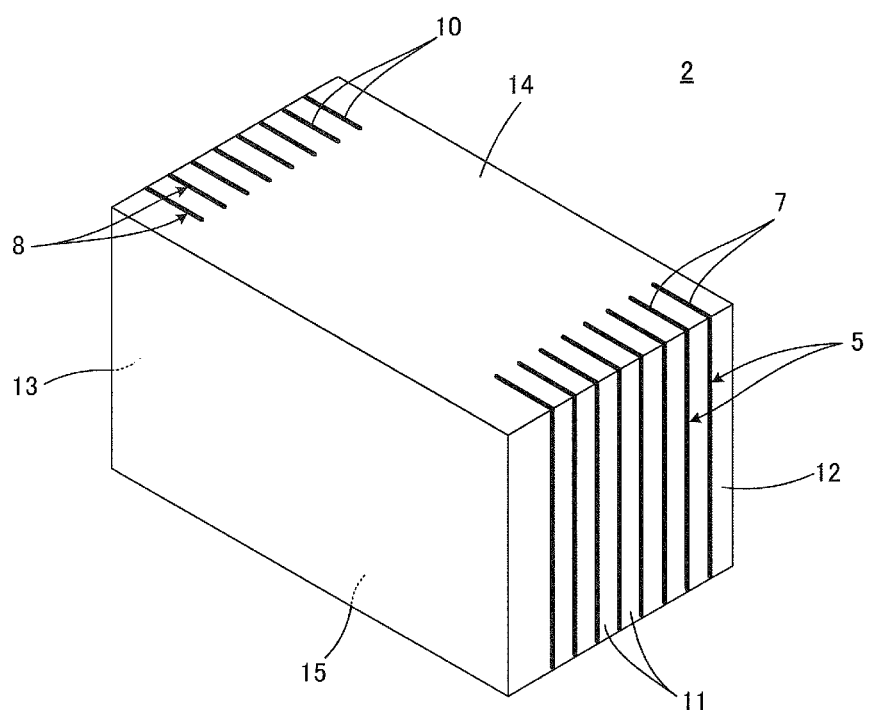
FIG. 2 is a perspective view illustrating a component main body for a laminated ceramic capacitor, which is configured with the use of the ceramic green sheets shown in FIGS. 1A and 1B.
Figure 3:
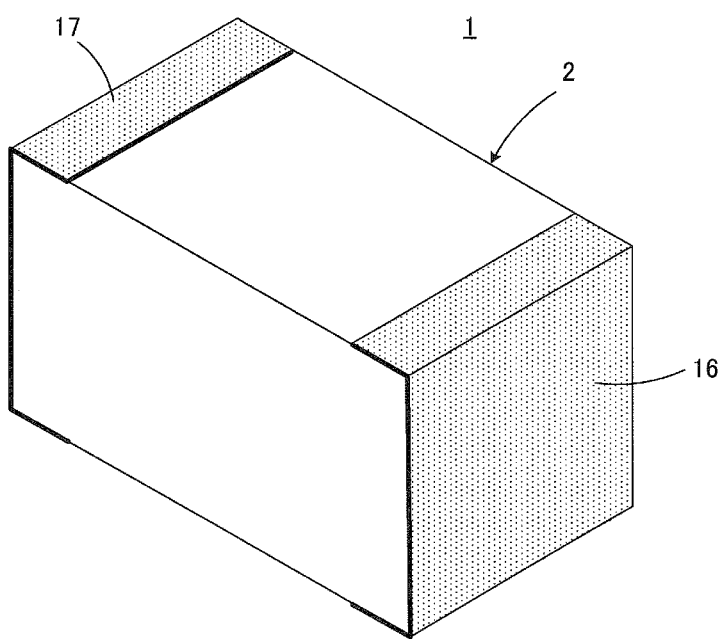
FIG. 3 is a perspective view illustrating a laminated ceramic capacitor with external electrodes formed by plating the component main body shown in FIG. 2.

In order to manufacture a laminated ceramic capacitor 1 shown in FIG. 3, a component main body 2 shown in FIG. 2 is prepared. Furthermore, in order to obtain the component main body 2 shown in FIG. 2, two types of ceramic green sheets 3 and 4 shown in FIGS. 1A and 1B are prepared, respectively.

A first internal electrode 5 is disposed on the ceramic green sheet 3 shown in FIG. 1A. The first internal electrode 5 includes a capacitance forming section 6 constituting a main portion thereof and an extraction section 7.

The extraction section 7 extends so as to reach one short side of the ceramic green sheet 3 and to reach portions for each of two long sides adjacent to the short side, thereby constituting an exposed end.

On the other hand, a second internal electrode 8 is disposed on the ceramic green sheet 4 shown in FIG. 1B. The second internal electrode 8 includes a capacitance forming section 9 making up a main portion thereof and an extraction section 10. The extraction section 10 is located on the side opposite to the extraction section 7 of the first internal electrode 5 described above. The extraction section 10 extends so as to reach one short side of the ceramic green sheet 4 and reach portions for each of two long sides adjacent to the short side, thereby constituting an exposed end.

The internal electrodes 5 and 8 described above are preferably formed respectively on the ceramic green sheets 3 and 4, for example, by printing a conductive paste containing, for example, Ni as its main constituent.

Next, the respective multiple ceramic green sheets 3 and 4 are stacked alternately, and an appropriate number of ceramic green sheets containing no internal electrodes are stacked on the both ends in the direction of stacking the ceramic green sheets 3 and 4 so as to make up outer layer sections. This stacking provides the component main body 2 in the raw.

It is to be noted that the stacking step described above may be carried out on mother ceramic green sheets from which a plurality of laminated ceramic capacitors can be extracted, and after the stacking step, a cutting step may be carried out to provide component main bodies 2 in the raw for individual laminated ceramic capacitors.

Next, a firing step is carried out. This firing step provides the sintered component main body 2 as shown in FIG. 2. The component main body 2 includes a plurality of ceramic layers 11 stacked. The ceramic layers 11 are obtained by sintering of the ceramic green sheets described above. In addition, the first and second internal electrodes 5 and 8 described previously are sintered, which are located along the interfaces between the ceramic layers 11. The extraction section 7 of the first internal electrode 5 defines an exposed end at one end surface 12 of the component main body 2, as well as partially at each of an upper surface 14 and a lower surface 15 adjacent to the end surface 12. The extraction section 10 of the second internal electrode 8 defines an exposed end at the other end surface 13 of the component main body 2, as well as partially at each of the upper surface 14 and lower surface 15 adjacent to the end surface 13.

Next, preferably, the component main body 2 is subjected to a barrel finishing step, thereby ensuring that the exposed ends of the internal electrodes 5 and 8 are exposed. Then, preferably, a washing step with pure water is carried out.

Then, in order to obtain the laminated ceramic capacitor 1 shown in FIG. 3, a first external electrode 16 electrically connected to the exposed ends of the first internal electrodes 5 is formed on the one end surface 12 of the component main body 2 as well as partially on each of the upper surface 14 and lower surface 15 adjacent to the end surface 12, and a second external electrode 17 electrically connected to the exposed ends of the second internal electrodes 8 is formed on the other end surface 13 of the component main body 2 as well as partially on each of the upper surface 14 and lower surface 15 adjacent to the end surface 13.

The first external electrode 16 and second external electrode 17 described above are formed at the same time, and has the same cross-sectional structure, and thus, the first external electrode 16 shown in FIG. 4 will be described in detail, whereas a detailed description of the second external electrode 17 will be omitted.

Figure 4:
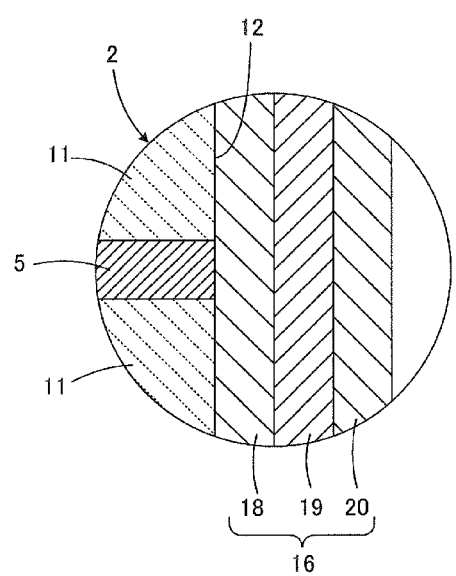
FIG. 4 is a diagram illustrating an enlarged cross section of the external electrode of the laminated ceramic capacitor shown in FIG. 3.
Figure 5:
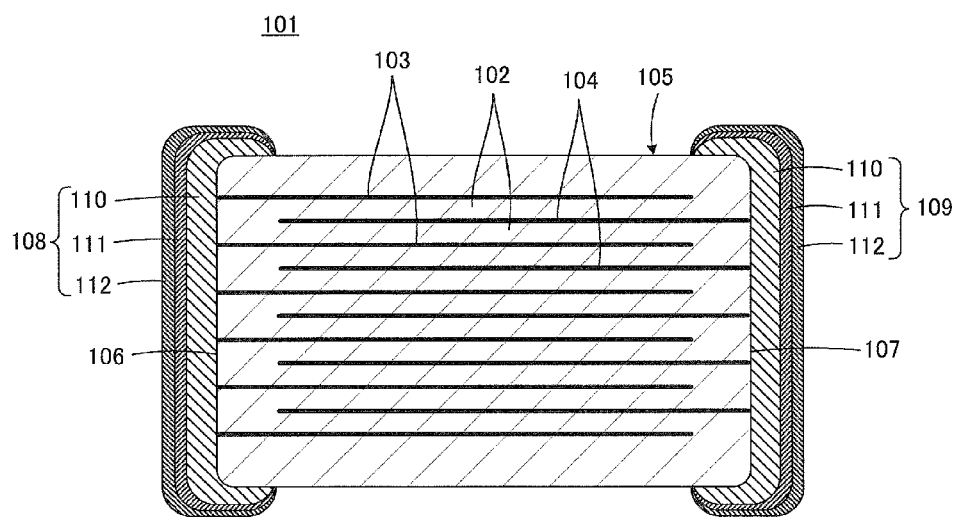
FIG. 5 is a cross-sectional view illustrating a conventional laminate type ceramic electronic component.

Referring to FIG. 4, the first external electrode 16 is made in such a way that a plating deposition deposited with the exposed ends of the respective internal electrodes 5 as starting points is grown on the one end surface 12 of the component main body 2 as well as partially on each of the upper surface 14 and lower surface 15 adjacent to the end surface 12 (see FIG. 2), and includes at least a first plating layer 18 composed of a Ni—P plating film with a P content rate of about 9 weight % or more, and a second plating layer 19 composed of a Ni plating film containing substantially no P, which is formed on the first plating layer 18, and preferably, further includes a third plating layer 20 formed on the second plating layer 19.

The third plating layer 20 is intended to improve the solderability of the external electrode 16, and composed of, for example, an Sn plating film.

The first plating layer 18 described above is preferably formed by electroless plating. Therefore, the step of providing a Pd catalyst and the step of washing with pure water are preferably carried out as pre-treatments prior to the electroless plating step, and then, electroless Ni—P plating is carried out to form the first plating layer 18 composed of a Ni—P plating film with a P content rate of about 9 weight % or more. In this case, the Ni—P plating film constituting the first plating layer 18 makes up a homogeneous and dense film while physically connecting the plating depositions on the respective exposed ends of the adjacent internal electrodes 5 to each other.

It is to be noted that while the Ni at the exposed ends of the internal electrodes 5 is substituted with Pd to improve the catalytic ability for a reducing agent in the electroless Ni—P plating in the step of providing a Pd catalyst described above, the Ni itself has catalytic performance, and it is thus possible to omit the step of providing a Pd catalyst.

As described above, when the first plating layer 18 is preferably formed by electroless plating, a plating film with a desirable P content can be formed stably. However, this advantage is not particularly desired, the first plating layer 18 may be formed by electrolytic plating.

After the electroless Ni—P plating step described above, a washing step with pure water is carried out.

After that, a heat treatment step may be carried out. As the heat treatment temperature, for example, a temperature of, for example, 600° C. or more, preferably 800° C. or more is adopted. This heat treatment causes interdiffusion between the internal electrodes 5 and the first plating layer 18. Then, the volume expansion of metal caused in this interdiffusion section can thus advantageously fill gaps which may be present at the interfaces between the ceramic layers 11 and each of the internal electrodes and first plating layer 18, thereby producing the effect of preventing the ingress of moisture into the component main body 2.

Next, the second plating layer 19 is formed which is composed of a Ni plating film containing substantially no P.

The second plating layer 19 is preferably formed by electrolytic plating. When the second plating layer 19 is formed by electrolytic plating, the second plating layer 19 can be formed efficiently. However, this advantage is not particularly desired, the second plating layer 19 may be formed by electroless plating.

After the electrolytic Ni plating step described above, a washing step with pure water is carried out.

Next, the third plating layer 20 is formed which is composed of, for example, an Sn plating film. The third plating layer 20 is preferably formed by electrolytic plating.

After the electrolytic Sn plating step described above, a washing step with pure water is carried out, and a drying step is then carried out.

In this way, the laminated ceramic capacitor 1 shown in FIG. 3 is completed.

The laminated ceramic capacitor 1 described above includes the ceramic layers 11 composed of a dielectric ceramic. However, the laminate type ceramic electronic component to which the present invention is directed is not limited to the laminated ceramic capacitor, and may be intended to constitute an inductor, a thermistor, a piezoelectric component, etc. Therefore, the ceramic layers may be composed of, in addition to the dielectric ceramic, a magnetic ceramic, a semiconductor ceramic, a piezoelectric ceramic, etc., depending on the function of the laminate type ceramic electronic component.

In addition, while the laminated ceramic capacitor 1 shown preferably is a two-terminal capacitor including the two external electrodes 16 and 17, the present invention can also be applied to multi-terminal laminate type ceramic electronic components with three or more terminals.

An experimental example will be described below which was carried out for confirming the advantageous effects of the present invention. In this experimental example, prepared were respective laminated ceramic capacitors according to samples 1 and 2 as examples within the scope of the present invention, as well as respective laminated ceramic capacitors according to samples 3 to 5 as comparative examples outside the scope of the present invention.

Sample 1

A component main body for a laminated ceramic capacitor with planar dimensions of 1.0 mm×0.5 mm was prepared which included ceramic layers composed of a barium titanate based dielectric ceramic and internal electrodes containing Ni as their main constituent. In this component main body, the ceramic layers between the internal electrodes each had a thickness of 1 μm, the internal electrodes each had a thickness of 1 μm, and the outer layer sections with no internal electrode placed each had a thickness of 50 μm. In addition, as pretreatments for a plating treatment described below, the component main body was subjected to barrel finishing to ensure that the internal electrodes had the exposed ends exposed, and a washing step with pure water was then carried out.

Next, the component main body was subjected to a step of providing a Pd catalyst. In the step of providing a Pd catalyst, a palladium chloride solution was prepared at a Pd concentration of 100 ppm, pH of 2.5, and a temperature of 25° C., and the component main body was immersed in the palladium chloride solution for 3 minutes. After the immersion, the component main body was pulled out from the palladium chloride solution, and subjected to washing with pure water.

Next, a rotation barrel with a drum volume of 300 cc and a diameter of 70 mm was prepared, and 20 ml of the component main body was put into the rotation barrel. Then, the rotation barrel was immersed in an electroless Ni—P plating bath, where an electroless plating treatment was carried out at a barrel rotation speed of 20 rpm for 20 minutes. In this case, as the electroless Ni—P plating bath, a plating bath set at a P content rate of 11 weight % was used which had a composition including 0.1 mol/L of nickel sulfate, 0.2 mol/L of sodium hypophosphite, 0.5 mol/L of citric acid, and 0.5 mol/L of ammonium sulfate. In addition, this electroless Ni—P plating bath was adjusted to pH of 8.0 with the use of sulfuric acid and sodium hydroxide as pH adjusters, and set at a bath temperature of 90° C.

In this way, a first plating layer composed of a Ni—P plating film with a P content rate of 11 weight % was formed with a film thickness of 1.5 μm.

After the electroless Ni—P plating treatment described above, washing with pure water was carried out.

Next, with the use of the same rotation barrel, 40 ml of media made of Sn—Ag—Cu with a diameter of 0.45 mm and 50 cc of stirring balls composed of nylon-covered iron balls with a diameter of 8.0 mm were put in addition to 20 ml of the component main body into the rotation barrel, where electrolytic Ni plating was carried out at a barrel rotation speed of 20 rpm to form, on the first plating layer, a second plating layer composed of an electrolytic Ni plating film containing substantially no P with a film thickness of 2 μm. In this case, as the electrolytic Ni plating bath, a Watt bath (nickel sulfate: 300 g/L, nickel chloride: 45 g/L, boric acid: 40 mg/L) was used which was set at pH of 4.0 and a bath temperature of 55° C.

After the electrolytic Ni plating treatment described above, washing with pure water was carried out.

Next, as described above, the same rotation barrel with 20 ml of the component main body, 40 ml of media, and 50 cc of stirring balls put therein was used to carry out electrolytic Sn plating at a barrel rotation speed of 20 rpm, and thereby form, on the second plating layer, a third plating layer composed of an electrolytic Sn plating film with a film thickness of 3 μm. In this case, a neutral Sn plating bath ("NB-RZ" from ISHIHARA SANGYO KAISHA, LTD.) was used as the electrolytic Sn plating bath.

After the electrolytic Sn plating treatment described above, washing with pure water was carried out, and drying was then carried out in air at a temperature of 80° C. for 15 minutes.

In the way described above, the laminated ceramic capacitor according to sample 1 was prepared.

Sample 2

The laminated ceramic capacitor according to sample 2 was prepared through the same steps as in the case of sample 1, except that the pH of the electroless Ni—P plating bath was adjusted to 8.5 to set the P content rate at about 9 weight % in the electroless Ni—P plating treatment for the preparation of the laminated ceramic capacitor according to sample 1.

Sample 3

The laminated ceramic capacitor according to sample 3 was prepared through the same steps as in the case of sample 1, except that the pH of the electroless Ni—P plating bath was adjusted to 10 to set the P content rate at 5.5 weight % in the electroless Ni—P plating treatment for the preparation of the laminated ceramic capacitor according to sample 1.

Sample 4

The laminated ceramic capacitor according to sample 4 was prepared through the same steps as in the case of sample 1, except that the pH of the electroless Ni—P plating bath was adjusted to 9 to set the P content rate at 8 weight % in the electroless Ni—P plating treatment for the preparation of the laminated ceramic capacitor according to sample 1.

Sample 5

The laminated ceramic capacitor according to sample 5 was prepared through the same steps as in the case of sample 1, except that the plating time was made longer to 55 minutes to provide an electroless Ni—P plating film as the first plating layer with a film thickness of 4 μm while the subsequent electrolytic Ni plating treatment was not carried out, in the electroless Ni—P plating treatment for the preparation of the laminated ceramic capacitor according to sample 1.

The respective laminated ceramic capacitors thus obtained according to samples 1 to 5 were evaluated for sealing properties and electrode fixing strength.

For the evaluation of sealing properties, the laminated ceramic capacitors according to each sample were mounted onto a substrate with soldering, and then subjected to a moisture resistance loading test for 150 hours under the conditions of temperature: 125° C., humidity: 95% RH, and applied voltage: 6.3 V, the sample with an insulation resistance IR decreased to less than $1 \times 10^7 \Omega$ was regarded as a defective, and the number of defectives was obtained among 72 samples.

For the evaluation of electrode fixing strength, the laminated ceramic capacitors according to each sample were mounted onto a substrate with soldering, and then subjected to a lateral pressing test in which the laminated ceramic capacitors were pressed laterally in a direction parallel to the substrate, the maximum stress value was measured at which peeling of the external electrode was caused, and the average value for the maximum stress value was obtained among 20 samples.

Table 1 below shows the P content rate of the electroless Ni—P plating film as the first plating layer, as well as the results of evaluations for sealing properties and electrode fixing strength.

TABLE 1

| Sample Number | P Content Rate | The Number of Defectives in Sealing Properties | Electrode Fixing Strength |
|---|---|---|---|
| 1 | 11 weight % | 0 | 12N |
| 2 | 9 weight % | 0 | 12N |
| 3 | 5.5 weight % | 10 | 5N |
| 4 | 8 weight % | 0 | 11N |
| 5 | 11 weight % (no second plating layer) | 2 | 12N |

As can be seen from Table 1, samples 1 and 2 including about 9 weight % or more for the P content rate of the electroless Ni—P plating film produced excellent results, with 0 for the number of defectives in sealing properties and with a high electrode fixing strength of 12 N.

In contrast to these samples, sample 3 having 5.5 weight % for the P content rate of the electroless Ni—P plating film, which is low and is significantly less than about 9 weight %, thus caused many defectives with the result of 10 for the number of defectives in sealing properties, and provided an extremely low electrode fixing strength of 5 N.

In addition, sample 4 having 8 weight % for the P content rate of the electroless Ni—P plating film, which is low and is less than 9 weight %, caused no defective with the result of 0 for the number of defectives in sealing properties, but provided a lower electrode fixing strength of 11 N as compared with samples 1 and 2.

In addition, sample 5 including 11 weight % for the P content rate of the electroless Ni—P plating film, which corresponds to about 9 weight % or more as in the case of sample 1, provided a high electrode fixing strength of 12 N, but caused defectives with the result of 2 for the number of defectives in sealing properties, because of no formation of the second plating layer composed of a Ni plating film containing substantially no P.

As for sample 5 described above, the laminated ceramic capacitors which were defective in sealing properties were analyzed to confirm cracking in the electroless Ni—P plating films.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminate type ceramic electronic component comprising:
    a component main body including a plurality of ceramic layers stacked on each other and a plurality of internal electrodes arranged along interfaces between the ceramic layers, each of the internal electrodes including an exposed end exposed at a surface; and
    an external electrode arranged on a surface of the component main body so as to be electrically connected to exposed ends of each of the internal electrodes; wherein
    the external electrode is directly plated on the surface of the component main body and comprises a first plating layer comprising a Ni—P plating film with a P content rate of about 9 weight % or more, and a second plating layer comprising a Ni plating film containing substantially no P, the second plating layer being disposed on the first plating layer.

2. The laminate type ceramic electronic component according to claim 1, wherein the first plating layer is an electroless plated layer, and the second plating layer is an electrolytic plated layer.

3. The laminate type ceramic electronic component according to claim 1, wherein the Ni—P plating film constituting the first plating layer is amorphous.

4. A method for manufacturing a laminate type ceramic electronic component comprising the steps of:
    preparing a component main body including a plurality of ceramic layers stacked on each other and a plurality of internal electrodes formed along interfaces between the ceramic layers, each of the internal electrodes including an exposed end exposed at a surface; and
    forming an external electrode on a surface of the component main body so as to be electrically connected to exposed ends of the internal electrodes; wherein
    the step of forming the external electrode includes:
    a step of carrying out electroless plating to deposit a plating deposition using the exposed ends of each of the internal electrodes as starting points, and growing the plating deposition on the surface to form a first plating layer composed of a Ni—P plating film with a P content rate of about 9 weight % or more; and
    a step of carrying out electrolytic plating to form, on the first plating layer, a second plating layer composed of a Ni plating film containing substantially no P.

* * * * *